United States Patent
Church

(10) Patent No.: US 7,484,523 B2
(45) Date of Patent: Feb. 3, 2009

(54) ROTATABLE WEDGE CARTRIDGE VALVE MECHANISM AND METHOD FOR ASSEMBLY AND DISASSEMBLY

(75) Inventor: Kris L. Church, Montgomery, TX (US)

(73) Assignee: Hemiwedge Valve Corporation, Conroe, TX (US)

( * ) Notice: Subject to any disclaimer, the term of this patent is extended or adjusted under 35 U.S.C. 154(b) by 0 days.

(21) Appl. No.: 11/588,685

(22) Filed: Oct. 27, 2006

(65) Prior Publication Data

US 2008/0099076 A1    May 1, 2008

(51) Int. Cl.
F16K 1/14 (2006.01)

(52) U.S. Cl. .............................. 137/15.22; 137/315.17; 137/454.6

(58) Field of Classification Search ............ 137/315.17, 137/454.2, 454.6, 15.18, 15.22, 15.25
See application file for complete search history.

(56) References Cited

U.S. PATENT DOCUMENTS

| | | |
|---|---|---|
| 3,121,553 A | 2/1964 | Grove |
| 3,990,676 A | 11/1976 | Brownstein |
| 4,071,220 A | 1/1978 | Iino |
| 4,113,231 A | 9/1978 | Halpine |
| 4,137,936 A | 2/1979 | Sekimoto et al. |
| 4,247,079 A | 1/1981 | Friess |
| 4,718,444 A | 1/1988 | Boelte |
| 4,747,578 A | 5/1988 | Kivipelto et al. |
| 4,953,587 A | 9/1990 | Steele |
| 4,962,911 A | 10/1990 | Soderberg |
| 5,010,917 A * | 4/1991 | Iqbal ....................... 137/454.6 |
| 5,145,150 A | 9/1992 | Brooks |
| 5,333,834 A | 8/1994 | Soderberg |
| 5,507,469 A | 4/1996 | Soderberg |
| 5,533,738 A | 7/1996 | Hoffmann |
| 5,707,042 A | 1/1998 | Maselli et al. |
| 6,082,707 A | 7/2000 | Hosie et al. |
| 6,123,094 A * | 9/2000 | Breda ....................... 137/454.6 |
| 2006/0196544 A1 | 9/2006 | Soderberg |

* cited by examiner

*Primary Examiner*—Kevin L Lee
(74) *Attorney, Agent, or Firm*—Claude E. Cooke, Jr.; Burleson Cooke, LLP

(57) ABSTRACT

A rotatable wedge cartridge valve has a cartridge body defining a cartridge chamber of a defined internal width having flow ports in communication with the cartridge chamber. A rotatable wedge valve cartridge assembly is removeably positioned within the cartridge chamber and has a controllable width. A core member defines a flow passage and has a spherical outer surface portion. A valve seat is located within the cartridge chamber. A rotatable wedge valve member is mounted for rotation relative to the core and has a concave surface portion in rotary guided relation with the spherical outer surface. The rotatable wedge valve member also has an external convex surface that is positioned for sealing engagement with the valve seat and has a geometry developing a non-uniform wall thickness along the rotatable wedge valve member.

18 Claims, 6 Drawing Sheets

ROTATABLE WEDGE CARTRIDGE VALVE MECHANISM AND METHOD FOR ASSEMBLY AND DISASSEMBLY

RELATED PATENTS

The present invention is generally related to the subject matter of U.S. Pat. Nos. 4,962,911, 5,333,834 and 5,507,469, each issued to Paul B. Soderberg and each being commonly owned with respect to the subject matter hereof.

BACKGROUND OF THE INVENTION

1. Field of the Invention

The present invention relates generally to valve mechanisms for controlling the flow of fluid though a flow passage. More particularly, the present invention concerns a rotatable wedge valve mechanism that may be defined by valve components contained within a valve body that is closed by a bonnet member or may be defined by a self-contained encapsulated rotatable wedge valve cartridge that is secured within a cartridge chamber of a valve body. Even more particularly, the present invention concerns an arrangement of internal valve components that permits a rotatable wedge valve assembly to have controllable lateral dimension or width that provides for simple and efficient installation and removal of internal valve components.

2. Description of the Prior Art

Many valve types have been employed for stopping and controlling the flow of fluids in a pipe or other flow path. Each of these valves offers certain advantages while suffering from other disadvantages. These valve types include plug cock valves, ball valves, screw-down stop valves, angle valves, butterfly valves, gate valves and sluice valves.

A simple plug cock valve comprises a rotatable, tapered plug having a bore therethrough disposed in a complimentary tapered housing. The plug cock valve permits fluid flow to be fully stopped by rotating the plug not more than 90°. These valves offer only minimal graduated control of fluid flow by setting the plug cock at intermediate positions and require modification for use in high pressure environments.

Ball valves comprise a rotatable ball having a bore therethrough corresponding to the fluid flow path together with a seat for sealing with the ball surface. Ball valves operate similarly to the previously described plug cock valves and offer similar advantages and disadvantages. More accurate flow control is obtained with conventional screw-down stop valves wherein a circular sealing element is disposed on the end of a threaded actuator or stem for cooperation with a seat disposed about an opening through which the fluid flows. Rotation of the actuator gradually lifts the sealing element, such as a washer or other device, away from the seat to provide more accurate control of gradual changes in the fluid flow.

Conventional gate or sluice valves are often employed in high flow and high pressure operations. These valves comprise a solid gate which is moved perpendicularly into the fluid path to block the flow. The gate may have either flat or inclined sides forming a flat or wedge shaped gate which is moved generally perpendicular to the fluid flow by rotation of a threaded handle operatively connected thereto.

The valves described above fail to provide a valve operable between stops defining its fully opened and fully closed positions in a quarter of one rotation or less while providing improved sealing in high pressure applications and shielding of the seat surface from erosion by the flowing fluid in both the opened and closed positions.

In the case of rotatable wedge valves it is well known that the rotatable wedge type valve element has a concave internal spherical surface portion that is engaged with the spherical external surface portion of a substantially immoveable core. The rotatable wedge element also defines an external spherical surface portion that is generated from a different center point as compared with the internal concave spherical surface and thus causes the valve element to have thick and thin wall portions. It is also known that the wall thickness of a rotatable wedge valve element typically increases gradually from its first leading end to its second or trailing end. Thus, in the closed position the thicker wall section of the rotatable wedge valve element will apply a force to a valve seat, but in the open position of the rotatable wedge valve element the thin wall section will have less force that will permit the assembly and disassembly of the valve components. It is desirable therefore to provide a rotatable wedge valve mechanism having a valve element geometry that causes development of seat engaging force at both the open and closed positions thereof which can be designed to develop force on the valve seat and other components at any selected valve position.

It is well known that valves often become unserviceable and need repair or replacement. Especially in the case of rotatable wedge type valves it is typically necessary to shut down a flow line for an extended period of time during which the rotatable wedge valve body is unbolted or otherwise released and removed from the flow line and replaced with another valve. It is desirable to provide a novel cartridge type rotatable wedge valve that can be efficiently restored for efficient service simply by removing and replacing a valve cartridge, thus eliminating the typical necessity to remove a valve housing from a flow line. A cartridge valve mechanism of this nature is disclosed in U.S. Pat. App. Pub. No. US 2006/0196544 A1, the subject matter of which is incorporated herein by reference for all purposes.

Those skilled in the art have long sought and will appreciate the novel features of the present invention which solves these problems.

SUMMARY OF THE INVENTION

It is a principal feature of the present invention to provide a novel rotatable wedge valve mechanism that is provided in cartridge form and provides for substantially complete restoration of a valve mechanism without necessitating removal of the valve body from a flow line.

It is another feature of the present invention to provide a novel rotatable wedge valve mechanism that accomplishes rotatable wedge valve activity in a manner combining the function of valve components and minimizing the number of valve components that are required.

Another object of the present invention is to provide a novel rotatable wedge valve mechanism that permits valve assembly or repair personnel to simply and efficiently control the effective lateral dimension of assembled valve components to permit simple and efficient unitary installation and removal of internal valve components.

Briefly, the various objects and features of the present invention are realized through the provision of a valve body that is adapted for connection in controlling relation with a flow passage and defines an internal chamber and flow passages in communication with the internal chamber. The internal chamber may conveniently take the form of a valve chamber within which internal valve components are operatively assembled or it may take the form of a cartridge chamber for receiving and containing an encapsulated rotatable wedge valve cartridge. In each case, whether a valve chamber or cartridge chamber is employed, a core member is located in substantially static position within the valve chamber. According to the present invention, the core member is of elongate generally tubular form and is provided with a generally spherical axle end portion that defines a dominant axis that functions as an axle member. The integral core member also includes an intermediate tubular section and a generally spherical, curved or rounded end portion. The generally spherical, curved or rounded end portion is disposed in engaging relation with a wall surface or other structural member of the valve or cartridge chamber, thus positioning the axle at a position intermediate the length of the valve chamber or cartridge chamber. A rotatable wedge valve member is positioned with its inner concave generally spherical surface in bearing and guided relation with the outer spherical surface of the axle member and is supported for substantially 90° rotation between open and closed positions. The rotatable wedge valve member defines a convex outer surface that is of substantially spherical configuration and is generated from an outer surface center-point that is off-set from the center-point from which the inner concave spherical surface is generated. The outer surface center-point is positioned relative to the inner surface center-point to provide the rotatable wedge valve member with an irregular thickness from its leading end to its trailing end. Preferably the rotatable wedge defines an intermediate region having a predetermined thickness and leading and trailing wall sections that each gradually increase to thickness dimensions that are greater than the intermediate thickness. This feature causes the development of significant interference at the open and closed positions of the rotatable wedge valve member and provides a rather loosely supported condition when the rotatable wedge valve member is at an intermediate position between its open and closed positions. The outer substantially spherical surface of the rotatable wedge valve member is in engagement with a corresponding sealing surface of an annular seat member that has a flow port with which the flow port of the rotatable wedge valve member is in registry when the valve is open. The rotatable wedge member develops variable force against the seat member at the various open, intermediate and closed positions of the valve member due to the geometry and relative wall thickness of the rotatable wedge member.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

FIG. 1 is an isometric illustration showing the assembly view of the preferred embodiment of a rotatable wedge valve mechanism that is constructed in accordance with the principles of the present invention and represents the best mode for practice of the invention;

FIG. 2 is a plan sectional view, illustrating the rotatable wedge cartridge valve assembly of FIG. 1, without the bonnet member of the valve and showing the valve or cartridge chamber that is defined by internal geometry of the valve body;

FIG. 3 is an isometric illustration showing a rotatable wedge cartridge valve mechanism with a bonnet member at the upper portion of the cartridge for connection with and forming a pressure resisting closure for a valve body;

FIG. 4 is a plan view in section showing the core, rotatable wedge valve member and seat in the open or flow permitting position of the rotatable wedge valve mechanism;

FIG. 5 is a plan view in section similar to that of FIG. 4 and showing the rotatable wedge valve member at an intermediate position between the open and closed positions thereof;

Figure 3:
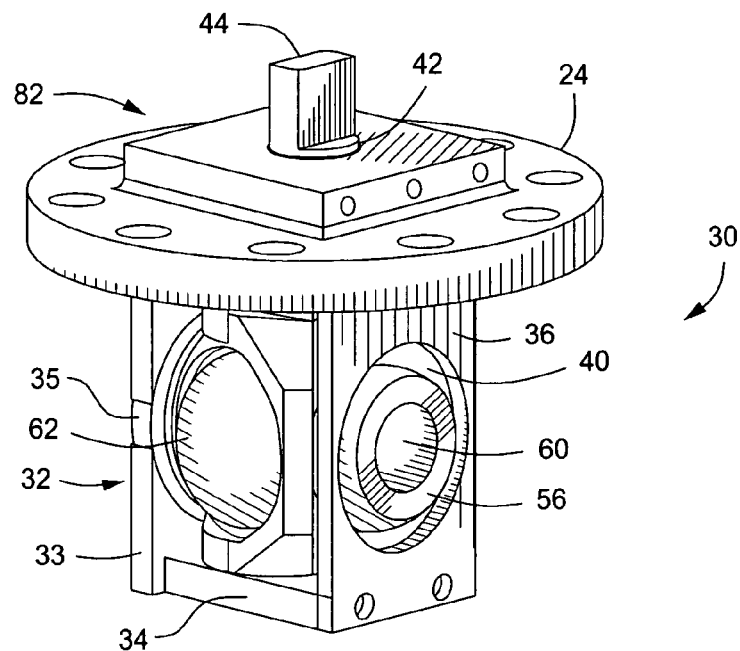
Figure 4:
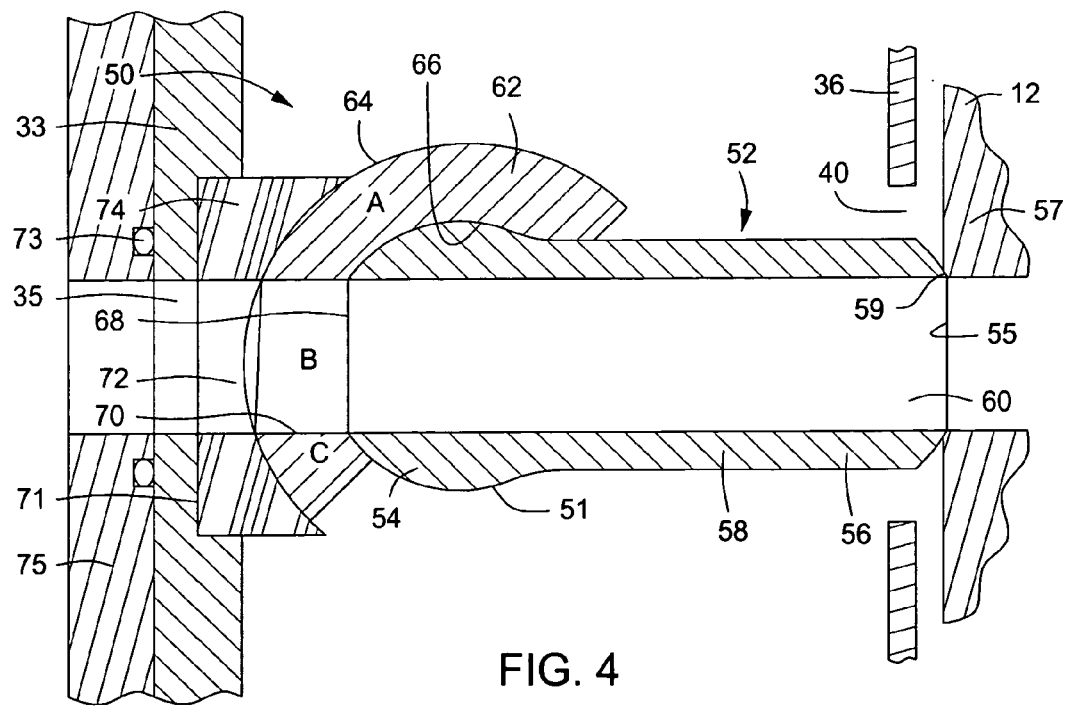
Figure 6:
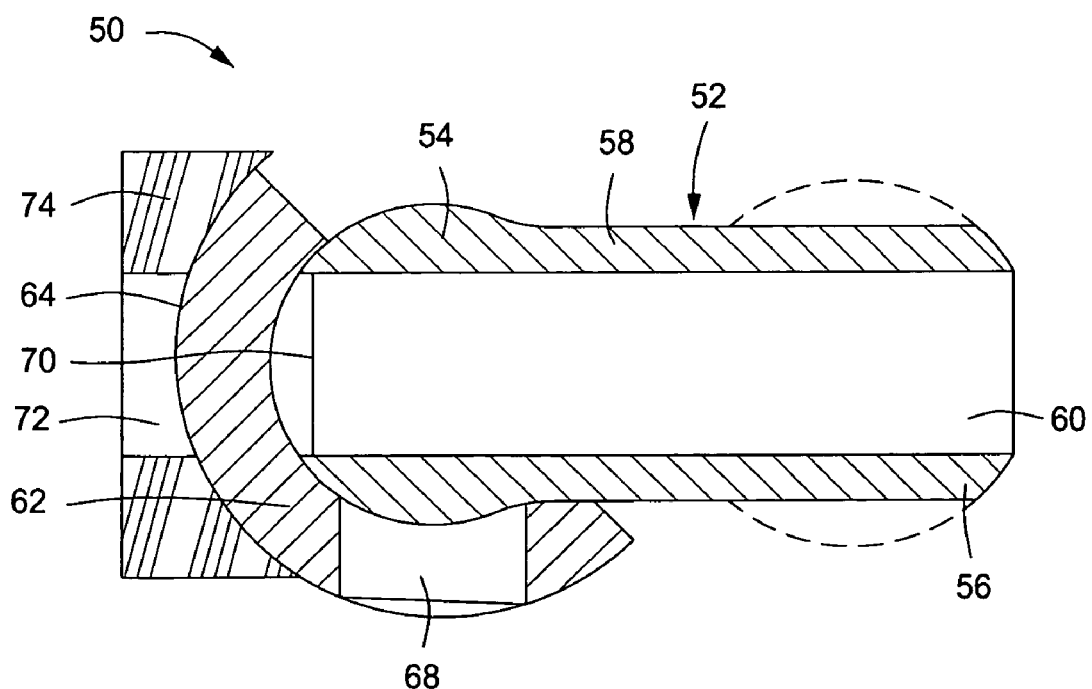

FIG. 6 is also a plan view in section similar to that of FIGS. 3 and 4, showing the components of the rotatable wedge valve mechanism in the closed position; and FIGS. 7-15 are side views shown in section and being schematic or diagrammatic illustrations sequentially showing the relative positions of the internal valve components of a rotatable wedge cartridge valve mechanism during installation and removal.

DETAILED DESCRIPTION OF PREFERRED EMBODIMENT

Figure 1:
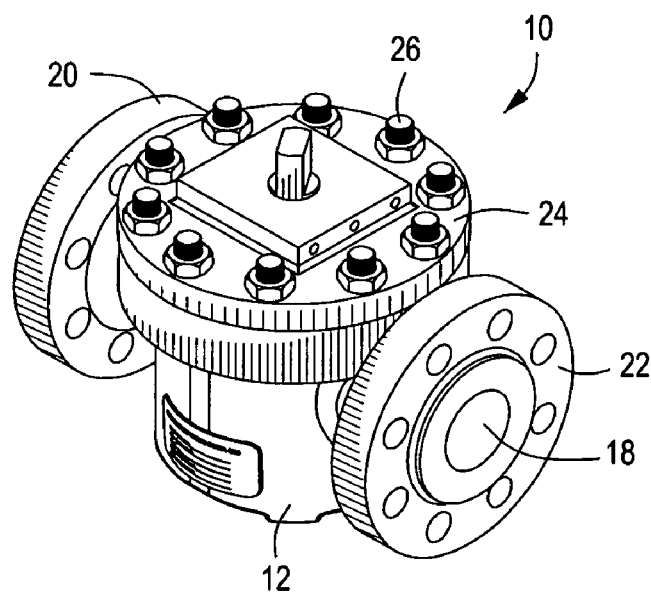
Figure 2:
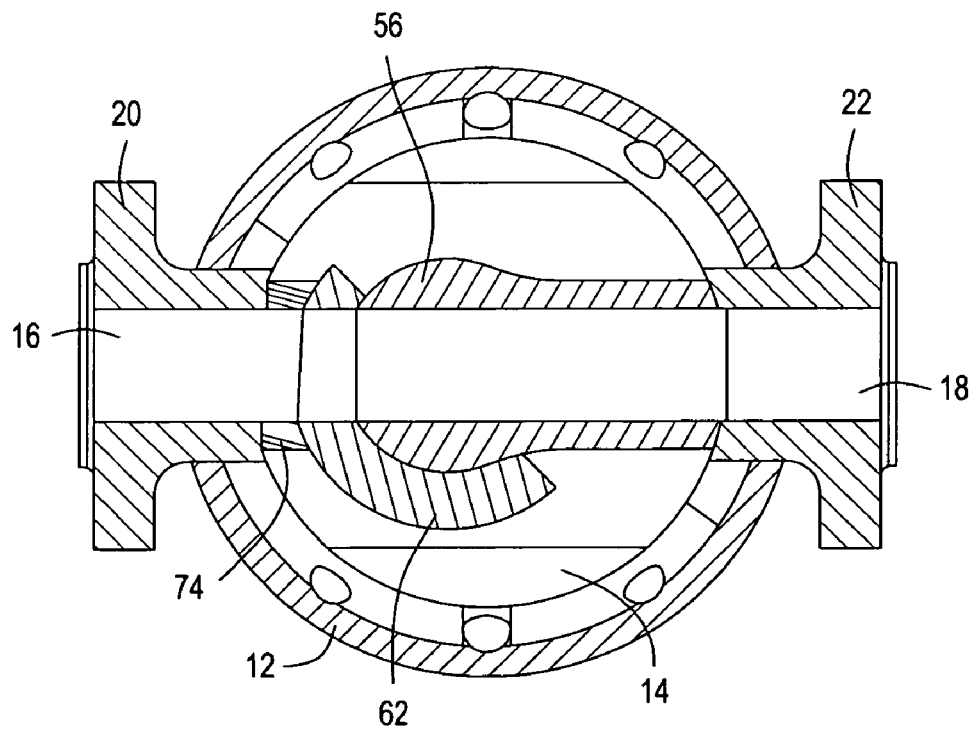

Referring now to the drawings and first to the isometric illustration of FIG. 1 and the plan view of FIG. 2, a rotatable wedge valve mechanism is shown generally at 10 and comprises a valve body 12 having a valve chamber 14 defining fluid flow passages 16 and 18 in communication with the valve chamber and having connection members 20 and 22 for connection of the valve body within a flow line. The connection members 20 and 22 may conveniently take the form of connection flanges for connection to a flow line by threaded stud and nut assemblies or by bolting or the connection members may take any other suitable form without departing from the spirit and scope of the present invention. A bonnet member 24 is shown to be mounted in sealed and pressure containing relation with the valve body 12, such as by means of stud and nut assemblies 26. It should be borne in mind that the bonnet member may also be retained in sealed and pressure containing relation with the valve body 12 by external clamp members, by threaded connection or by any other suitable means. The bonnet member 24 is not shown in FIG. 2 to thus provide for inspection of the interior components of the valve mechanism.

Figure 5:
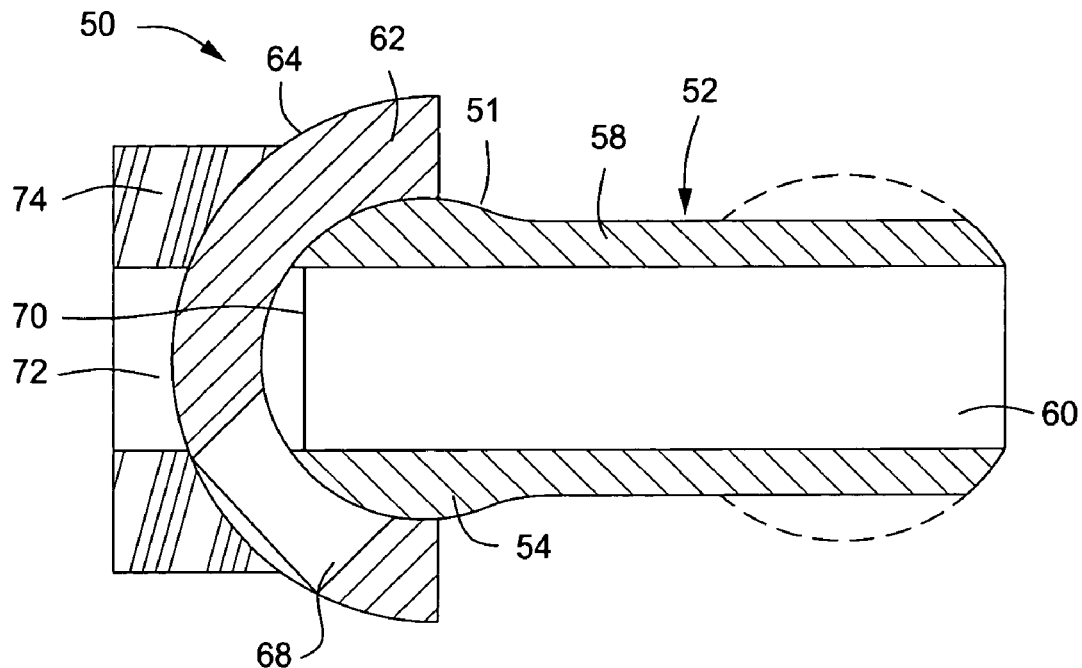

The rotatable wedge valve mechanism of the present invention may have internal valve components that are assembled within a valve chamber of the valve body 12 of FIGS. 1 and 2. However, the internal valve components are shown to be designed particularly for containment of a replaceable encapsulated rotatable wedge valve cartridge of the general nature that is shown generally at 30 in FIG. 3, with the internal valve components thereof being shown diagrammatically in FIGS. 4-6 of the drawings. In this case, the rotatable wedge valve cartridge 30 is provided with a bonnet member such as that shown at 24. The bonnet member 24 may be fixed or connected integrally with the cartridge housing structure or, if desired, it may simply form a closure for the valve chamber and serve to encapsulate the valve cartridge within the valve chamber 14. The rotatable wedge valve cartridge 30 comprises a cartridge housing shown generally at 32 having a valve seal plate 33, a bottom plate 34 and a retainer plate 36. The valve seal plate 33 is provided with an opening 35 for fluid flow and the retainer plate 36 is provided with a large oval or elongate opening 40 that is in registry with the fluid flow passages 16 and 18 of the valve body 12 of FIGS. 1 and 2. Within the cartridge housing 32 various valve components such as the core, rotatable wedge valve member and valve seats are positioned substantially as shown in FIGS. 4-6. The cartridge assembly 30 is simply installed within a valve chamber 14 of the valve body 12 and is secured within the valve body by any suitable bonnet retainer mechanism. Though the rotatable wedge valve cartridge is shown in FIG. 3 to have a cartridge housing of generally rectangular configuration, such is not intended to limit the spirit and scope of the present invention. The cartridge housing may have a tapered, conical, or other suitable configuration within the scope of this invention. A valve stem 42 and valve actuator connection 44 project upwardly from the bonnet member 24 as shown in FIG. 3 to provide for actuation of the valve mechanism by a manually operated valve actuator or any of a number of different types of mechanized valve actuator.

Referring now to FIGS. 4-6, the plan views in section show an embodiment of the present invention, generally at 50 which employs a one piece elongate tubular core member shown generally at 52 in combination with the rotatable wedge valve features that have been described above. In FIG. 4 components and structures of the valve body and cartridge housing are partially shown. In FIGS. 5 and 6 only the seat, core member and rotatable wedge valve member are shown for purposes of simplicity. FIG. 4 represents the open position of the rotatable wedge valve mechanism with the integral or one piece elongate tubular core member 52 being shown to have a ball end 54 and a second end 56 being integrally connected with the ball end by a tubular connecting section 58. If desired, the second end 56 may also have a substantially spherical configuration, as shown in broken line in FIG. 5, or it may have a more blunt curved end as shown in FIG. 4. The second end 56 of the one piece elongate tubular core member projects through the elongate opening 35 of the retainer plate 36 and is disposed for engagement within a recess or depression 55 defined within the inwardly facing surface of a wall 57 of the valve body 12. The recess or depression is defined in part by an annular recess surface 59 that circumscribes a flow passage of the valve body and provides for force resisting engagement by the second end of the one piece elongate tubular core member 52. A flow passage 60 is defined by the one piece elongate tubular core member 52 to provide for fluid flow through a major portion of the valve chamber. The ball end member 54 of the core member 52 functions as the dominant axis or axle for a rotatable wedge valve member 62 that is rotatable to open, intermediate and closed positions as will be described below. The rotatable wedge valve member 62 is shown to define an outer convex outer surface 64 establishing an outer diameter (OD) and an inner concave surface 66 establishing an inner diameter (ID). Rotatable wedge valve member 62 further defines a flow port 68 which is positioned in registry with a flow passage of the valve body in the open condition of the valve mechanism. Inner concave surface 66 is concentric with respect to the center-point of the spherical core or ball end member 54 and establishes guided or bearing engagement with the convex outer surface 51 of the ball end member 54 for support of the rotatable wedge valve during its flow controlling rotation. Thus, the ID of the rotatable wedge valve member forces the core member into contact with the recess 55 of the inner wall surface of the valve chamber of the valve body as shown in FIG. 4.

Typically, as explained above, the thickness of a conventional rotatable wedge valve member increases gradually and consistently from a leading region of predetermined thickness to a trailing region of greater thickness. The region of greater thickness is typically positioned in engagement with the seat member of the valve when the valve is at its closed position, thereby causing the effective valve component length to be at its maximum and resulting in the development of sealing compression with respect to the seat member thus enhancing the sealing capability of the valve. At the open position of the valve mechanism the region of less thickness is located to minimize the effective length of the assembled valve components, thus permitting the valve components to be somewhat loosely positioned or to have low interference contact within the valve chamber, providing the capability for simply and efficiently assembling and disassembling the components in the valve.

In contrast, the outer or convex surface 64 of the rotatable wedge member of the present invention is generated from a different center-point than the axle center-point, providing the outer convex surface with eccentric positioning as compared with the center-point of the ball end member 54, thus causing the thickness of the rotatable wedge member to be non-uniform from its leading end to its trailing end. Preferably the rotatable wedge valve member 62 has an intermediate wall section having a predetermined thickness and leading and trailing end sections of greater wall thickness as compared with the thickness of the intermediate wall section. This wall thickness arrangement is referred to as "thick-thin-thick" and is arranged to develop seal compression or sealing interference with the seat member at both the open and closed positions of the valve. When the rotatable wedge valve member is located at its intermediate position, essentially as shown in FIG. 5, the seat compression or interference will be minimal or non existent, thus allowing simple and efficient disassembly of the valve components. To facilitate assembly of the valve mechanism the rotatable wedge valve member is oriented to its intermediate position so that its lateral or end-to-end length is at its minimum, thus providing sufficient clearance to permit simple and efficient assembly of the valve components within the valve chamber. For example, when the valve mechanism is used for throttling service, with the flow port partially open, a condition of low or controlled interference will prevent flow induced vibration or other movement of the rotatable wedge member and other valve components. The position of the OD of the rotatable wedge member with respect to the ID thereof is adjusted to accomplish the degree of interference that suits the service conditions for which the valve mechanism is intended.

In the open position of the rotatable wedge valve member 62, the flow port 68 is positioned in registry with an opening 70 of the flow passage 60 of the elongate tubular core member 52 and with the flow port 72 of a seat member 74, permitting flow through the valve mechanism to occur. As is evident from FIG. 4, the seat member 74 is preferably seated within a seat recess 71 that is defined within the valve seal plate 33 of the cartridge housing. The valve seal plate 33 is intended to be sealed with respect to the valve body, such as by means of an O-ring seal 73 that is contained within a circular seal pocket of a wall 75 of the valve body 12. The OD of the rotatable wedge valve member maintains continuous engagement with the seat member and independently forces the seat member to maintain sealing engagement with an inner surface of the valve body. This force also maintains the seat member in efficient sealing relation with the valve body in the open and closed positions. From the standpoint of the "thick-thin-thick" wall thickness arrangement discussed above, in the closed position of the rotatable valve member a thicker wall section will be presented in engagement with the valve seat 74. By virtue of the wedging or camming activity that takes place during rotation of the rotatable valve member to its closed position, the eccentric outer convex surface 64 of the rotatable wedge valve member 62 will increase the engagement interference of the convex surface with the seat member 74 thus providing for increased interference of the valve assembly with the valve body wall and the seat member. This increased cam actuated compression against the seat member correspondingly increases the sealing capability of the valve mechanism. Between the open and closed positions, i.e., the intermediate or half-way position of FIG. 5 the thin section of the rotatable wedge valve member will be positioned between the core member and the seat member and will typically provide a loosely assembled or low interference condition that permits assembly and disassembly of the valve mechanism with respect to the valve or cartridge chamber.

As shown in FIG. 5 the rotatable wedge valve member 62 is shown to have been rotated approximately 45° from the position shown in FIG. 4 so that the flow port 68 has moved out of alignment with the flow port 72 of the seat member 74. In the event the valve mechanism is to be employed for throttling service the rotatable wedge valve member 62 may assume a partially open and partially closed position so as to establish a desired flow passage dimension for controlling the volume of discharge of fluid from the valve.

In FIG. 6 the rotatable wedge valve member is shown to be at its fully closed position with a solid wall structure thereof disposed in full engagement with the valve seat, thus blocking the flow of fluid through the flow port 72 of the seat member 74. At the closed position of the rotatable wedge valve member it should be borne in mind that a relatively thick region of the rotatable wedge valve member will be in engagement with the seat member, thus compressing the seat member and enhancing the sealing characteristics of the valve.

It is important to understand that the wall thickness dimensional features of the rotatable wedge valve member causes increase or decrease of valve component interference depending on the rotated, i.e., "open", "intermediate" or "closed" position of the rotatable wedge valve member. This feature becomes clear when the relative dimensions of the various components are understood. Referring again to FIGS. 4-6, "A" is the measurement of the distance between the outer spherical surface 64 of the rotatable wedge valve member to the outer spherical surface 51 of the spherical ball end 54 of the integral core member 52. Measurement "B" is the measurement of the OD of the rotatable wedge valve member, defined by the exterior spherical surface 64, and the outer surface of the axle, which is defined by the outer surface 51 of the spherical ball end 54 of the integral core member 52. Measurement "C" is the measurement from the OD of the rotatable wedge valve member to the axle surface as shown in the intermediate valve position of FIG. 5.

If "C" or "A" equals "B" then either "C" or "A" will become the secondary dominant axis and will function to force both the valve seat and core member into engagement with the valve body. These dimensional relationships can be achieved by changing the position of the center-point from which the OD of the rotatable wedge valve member is generated in relation with the center-point of the axle or core member, resulting in changes of the relative dimensions "A", "B" and "C". The regions of relative thickness of the rotatable wedge member can be adjusted according to the interference and sealing characteristics for which the valve is designed. The intermediate region of the rotatable wedge member can be thin to permit assembly and disassembly of the valve mechanism during valve repair and the leading and trailing ends of the rotatable wedge valve member can be of greater thickness as compared with the thickness of the intermediate valve section for enhanced sealing at both the open and closed positions. The leading and trailing sections of the rotatable wedge valve member can be of different thickness to provide for different interference at the open and closed positions of the valve member. Also, if desired, the intermediate valve section may be of greater thickness as compared with the leading and trailing valve sections to provide for characteristics of enhanced interferences when the valve is located at an intermediate position.

Referring to FIGS. 7-15 there is shown in step by step diagrammatic form the various steps for placement of a cartridge assembly shown generally at 80 within a valve chamber or cartridge chamber, establishment of the working position of the cartridge assembly and, when needed, extraction of the cartridge assembly from the valve or cartridge chamber. This activity is accomplished simply by controlling the effective length of the cartridge assembly by controlling the positions of an elongate tubular core member shown generally at 82 and a rotatable wedge valve member 84 as set forth below.

Figure 7:
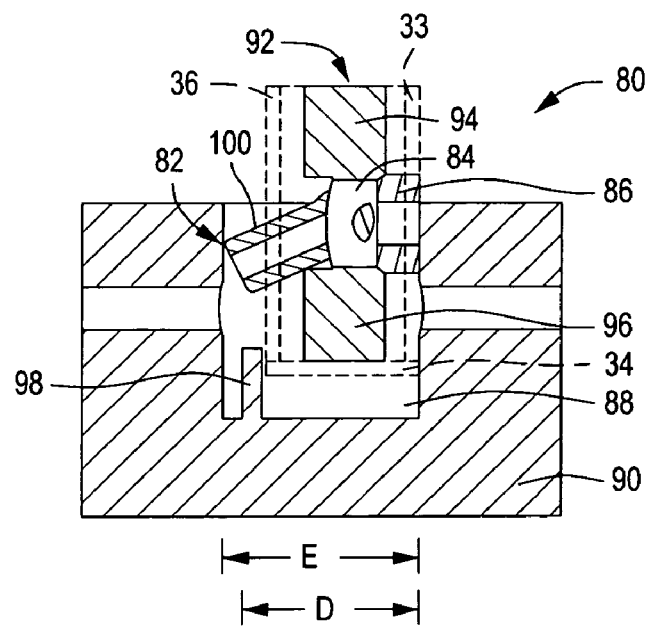

The valve cartridge assembly 80 is preferably provided with a one piece elongate tubular core member 82 that may be of the construction and function shown in FIGS. 4-6. Referring to FIG. 7, the cartridge valve assembly includes a rotatable wedge valve member 84 and a valve seat 86 as shown in the various figures and is adapted for positioning within a valve chamber 88 of a valve body 90. Within the valve chamber 88 there is positioned a valve cartridge shown generally at 92 having a normal cartridge width "D" which is less than the width E of the valve chamber. The rotatable wedge valve member 84 is shown to have an integral trunnion and/or valve stem arrangement which is considered preferable for support and rotational operation of the rotatable wedge valve member and for simplicity of valve manufacture and assembly. However, separate stem and trunnions may be employed without departing from the spirit and scope of the present invention. As shown in the figures, the rotatable wedge valve member 84 is shown to have an integral valve stem 94 and an integral trunnion member 96 which provide for its support and controlled rotation within the valve or cartridge chamber.

The rotatable wedge valve cartridge 92 is of the nature shown in FIGS. 4-6. Within the valve chamber is located a core positioning element 98 which is disposed for contact by an end portion 100 of the elongate tubular core member 82. The trunnion member 96 is preferably integral with the rotatable wedge valve member 84 or is connected thereto in any suitable manner and a valve stem 94 is preferably integral with the rotatable wedge valve member 84 as well. The valve stem may be mounted to or connected with the upper part of the rotatable wedge valve member in any suitable manner that achieves rotary driving relation of the valve stem with the rotatable wedge valve member. The upper part of the valve stem 94 corresponds with valve stem 42 of FIG. 3 and extends in sealed relation through an opening of the bonnet member 24 and is provided with a valve actuator drive connection of any suitable nature.

Figure 8:
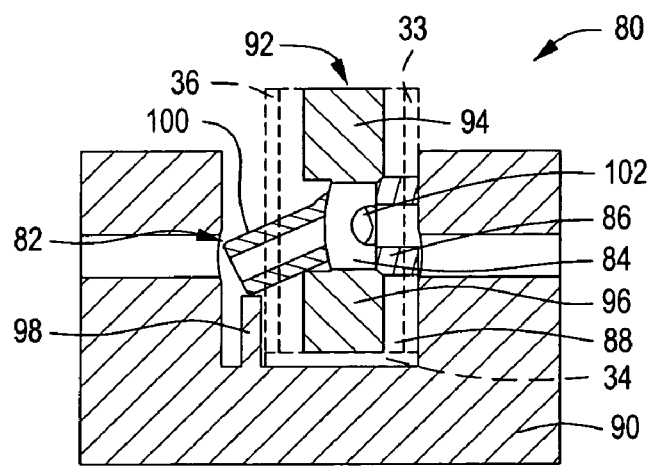
Figure 9:
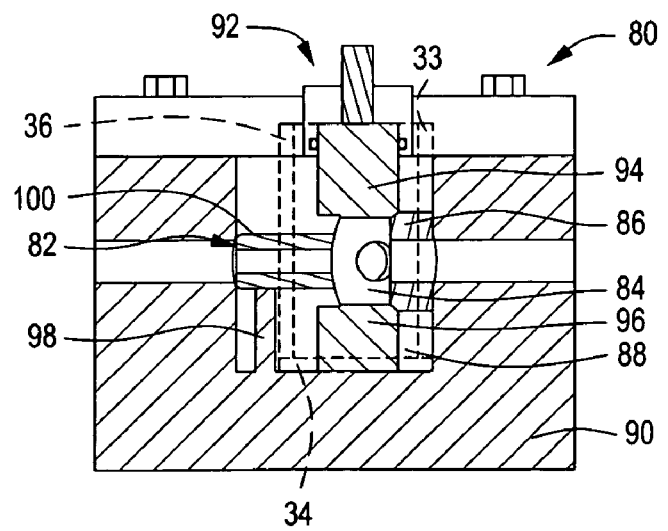

FIGS. 7 and 8 represent the condition where a valve cartridge is being inserted into the valve chamber 88 of the valve or cartridge body 90 in replacement for a valve cartridge that has been removed for repair or replacement. The elongate tubular core member 82 is moved to a downwardly inclined position to minimize the width of the valve cartridge thus permitting the valve cartridge to be inserted into the valve chamber. The downwardly inclined position of the elongate tubular core member 82 minimizes the width "D" of the cartridge assembly so that the width thereof is less than the width "E" of the valve chamber. Thus the cartridge width dimension "C" of FIG. 7 in this case is less than the valve chamber width "E", permitting the valve cartridge to be inserted into the valve chamber of the valve body. When "E" is greater than "D" the difference in measurements is the clearance that exists when the core member 82 is angulated to the position of FIG. 7. The cartridge 92 is moved downwardly within the valve chamber until the end portion 100 of the elongate tubular core member 82 comes into contact with the core positioning element 98. Further downward movement of the cartridge within the valve chamber, from the position of FIG. 8 will cause the core positioning element 98 to essentially pivot the spherical or ball core end member 102 (FIG. 10) within the concave internal core receptacle of the rotatable wedge valve member 84. When lowering the cartridge further into the valve chamber, as the core member 84 is pivotally moved the cartridge assembly width "D" will gradually increase until it becomes equal with the valve chamber width "E". As this pivoting movement of the dual ball core member occurs, the effective width of the cartridge will increase until it applies compressive force to the seat member 86 and establishes a tight fitting and effective sealing relationship of the cartridge assembly within the valve chamber as shown in FIG. 9. This cartridge expansion activity during valve cartridge installation causes the development of significant compression of the rotatable wedge valve member 84 with respect to the seat member 86 and thus enhances the sealing capability of the valve mechanism. This feature is important particularly in low pressure valve service conditions where the pressure development of force between the rotatable wedge valve member and the seat may not be otherwise sufficient to achieve effective low pressure sealing.

Figure 10:
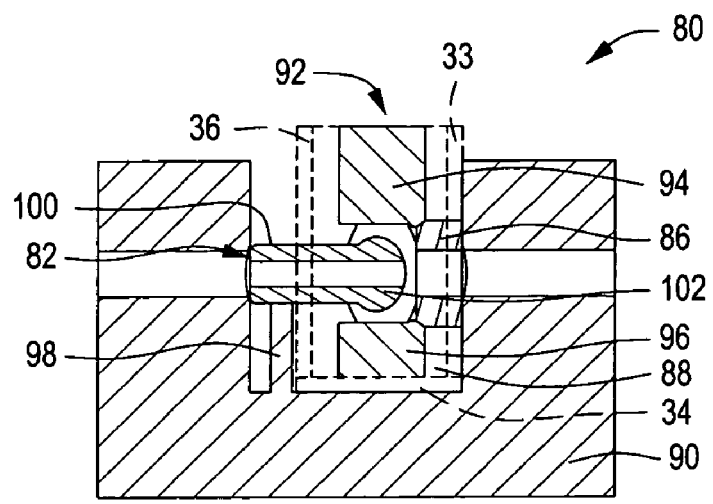

FIG. 10 shows the rotatable wedge valve member being rotatably positioned to its open position, the position also shown in FIG. 9. In this case the cartridge assembly width "D" has been expanded by the rotatable wedge valve member to form a tight fit and efficient seal within the valve chamber. By rotation of the rotatable wedge valve member 84 toward the open position the thick-thin-thick arrangement of its wall thickness moves a thick wall section into engagement with the seat member 86 thus compressing the seat and enhancing the sealing capability of the valve mechanism.

Figure 11:
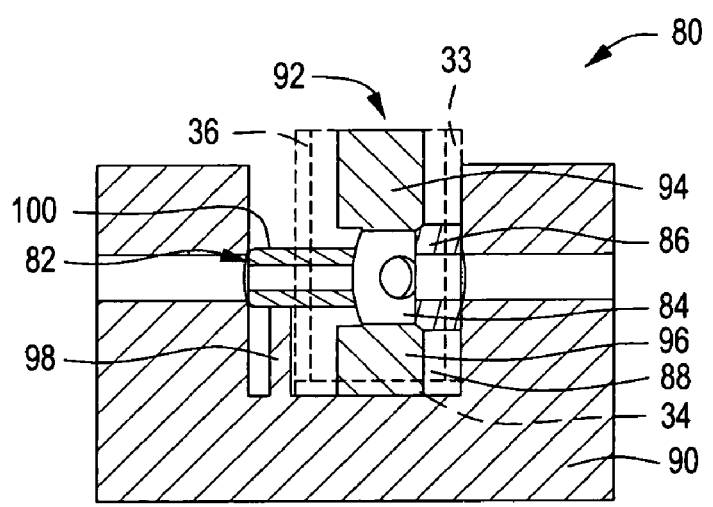

FIG. 11 represents the position of the rotatable wedge valve cartridge at an intermediate position substantially half-way between the open and closed positions. At this position a relatively thin wall section of the rotatable wedge valve member will be positioned at the seat member, thus providing the components of the cartridge assembly with a relatively loose fit or low interference engagement, permitting insertion or removal of the cartridge assembly. The rotatable wedge valve member would be positioned essentially as shown in FIG. 11 for throttling service where the valve port is open only sufficiently to permit a desired volume of flow for a certain line pressure. This is the same position as shown in FIG. 9. The cartridge chamber width "E" of the valve body is greater than the cartridge assembly width "D" so that a condition of clearance exists between the cartridge assembly width and the internal width of the cartridge chamber. Several conditions can exist at the cartridge condition of FIGS. 9 and 11, depending on the geometric characteristics of the outer convex surface of the rotatable wedge valve member. When "C" is greater than "B" a condition of significant interference will exist and the cartridge assembly will be secure within the valve or cartridge chamber. When "C" and "B" are equal little or no interference or clearance will exist. When "B" is greater than "C" there will be clearance and no interference of the cartridge assembly with the opposed walls of the valve or cartridge chamber and thus the valve member will have the capability for at least limited movement.

Figure 12:
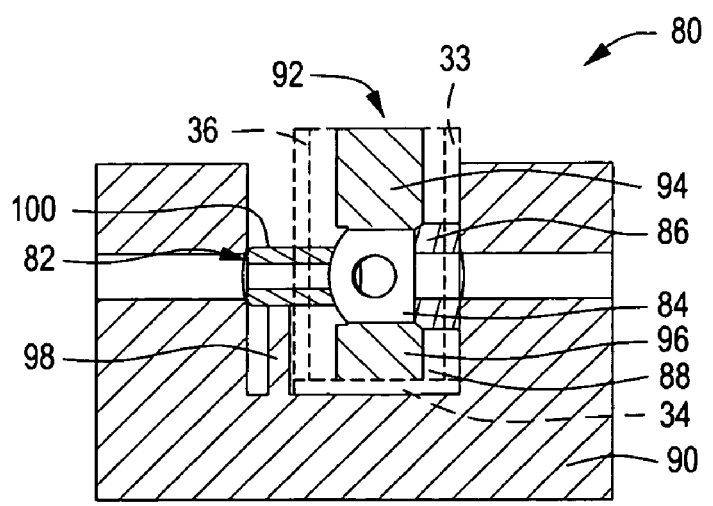

FIG. 12 illustrates the closed position of the rotatable wedge valve mechanism. This condition causes the cartridge assembly to be firmly locked within the valve or cartridge chamber. When this condition exists the rotatable wedge valve member will have been rotated to a position causing a relative thick region of the wall thickness thereof to be disposed in engagement with the valve seat 86. This thick region causes compression of the rotatable wedge valve member against the valve seat and develops a condition of significant interference which enhances the sealing capability of the valve mechanism.

Figure 13:
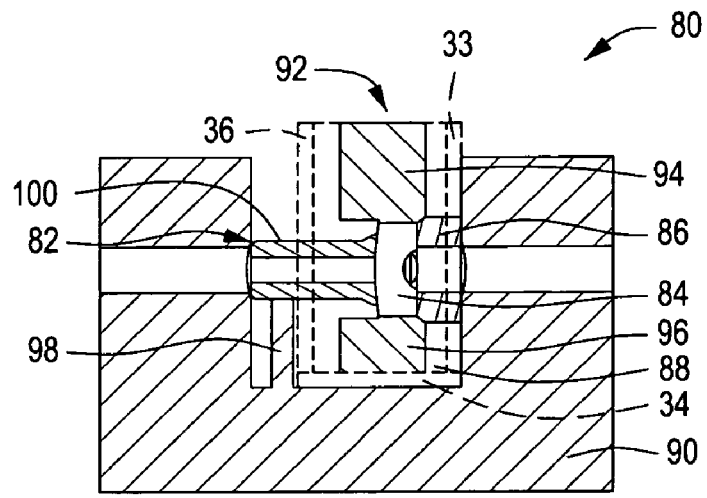

FIG. 13 illustrates a cartridge condition where the rotatable wedge valve member of the cartridge has been rotated to its disassembly position. When this condition exists there will be little or no interference of the cartridge within the cartridge chamber and clearance of the cartridge assembly with respect to the spacing of the cartridge chamber walls will likely exist. When in this condition, the cartridge assembly is free to be removed from the cartridge or valve chamber.

Figure 14:
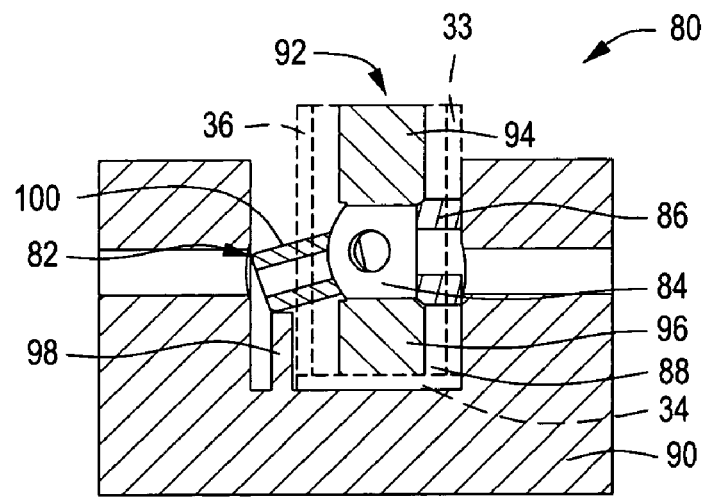
Figure 15:
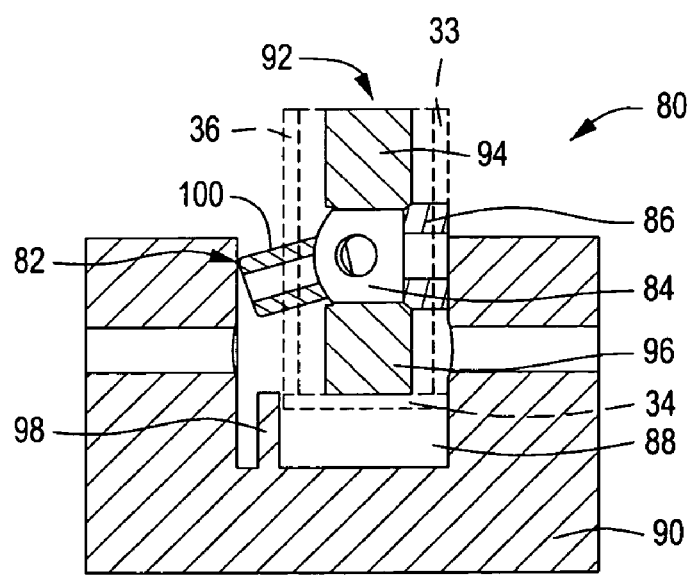

FIG. 14 shows the step of lifting the valve cartridge from the valve chamber and is much the same as shown in FIG. 8. To minimize the width dimension of the cartridge assembly, the elongate tubular core member is pivoted downwardly about its ball end 102 as a lifting force is applied to the cartridge assembly. Tilting of the elongate tubular core member in this manner effectively reduces its width to a width less than the internal width of the valve chamber 88. FIG. 15 shows removal of the cartridge from the valve or cartridge chamber.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A rotatable wedge cartridge valve mechanism, comprising:
   a valve body defining a valve chamber of a defined internal width having flow passages in communication with said valve chamber;
   a rotatable wedge valve cartridge assembly having a cartridge housing being removably positioned within said valve chamber and having a controllable width;
   said rotatable wedge valve cartridge assembly having a core member defining a substantially spherical outer surface portion;
   a valve seat being located within said cartridge chamber; and
   a rotatable wedge valve member being mounted for rotation about said substantially spherical outer surface portion of said core member, and having an external convex surface being disposed in controlled interference engagement with said valve seat and defining a non-uniform wall thickness.

2. The rotatable wedge cartridge valve mechanism of claim 1, comprising:
   said rotatable wedge valve member having a concave surface portion in rotary guided relation with said substantially spherical outer surface portion of said core member.

3. The rotatable wedge cartridge valve mechanism of claim 1, comprising:
   trunnion and operating stem members supporting said rotatable wedge valve member for rotation within said cartridge chamber.

4. The rotatable wedge cartridge valve mechanism of claim 3, comprising:
said trunnion member being integral with said rotatable wedge valve member.

5. The rotatable wedge cartridge valve mechanism of claim 3, comprising:
said trunnion member and said operating stem member each being integral with said rotatable wedge valve member.

6. The rotatable wedge cartridge valve mechanism of claim 1, comprising:
said core member being of elongate configuration and defining a curved surface at one end thereof being disposed in pivotal engagement with said concave surface portion of said rotatable wedge valve member.

7. The rotatable wedge cartridge valve mechanism of claim 1, comprising:
said concave surface portion of said rotatable wedge valve member being of substantially spherical configuration; and
said core member being of elongate tubular configuration and defining a substantially spherical outer surface at one end thereof being disposed in pivotal engagement with said substantially spherical concave surface portion of said rotatable wedge valve member.

8. The rotatable wedge cartridge valve mechanism of claim 1, comprising:
said concave surface portion of said rotatable wedge valve member being of substantially spherical configuration;
said core member being of elongate configuration and defining a tubular section and a substantially spherical member being integral with said tubular section, said substantially spherical member being disposed in rotatable engagement with said substantially spherical concave surface portion of said rotatable wedge valve member; and
a core positioning member being located within said valve chamber and being engaged by and causing positioning movement of said core member during insertion of said rotatable wedge valve cartridge assembly within said valve chamber.

9. A method for assembling a rotatable wedge valve cartridge within a cartridge chamber of a defined width, said rotatable wedge valve cartridge having an elongate core member and a rotatable wedge valve member having rotational engagement with said elongate core member, and a valve seat within said cartridge chamber, said method comprising:
positioning said elongate core member in inclined relation defining a cartridge width less than said defined width;
inserting said rotatable wedge valve cartridge into said cartridge chamber; and
moving said elongate tubular core member from said inclined position to a substantially horizontal position increasing said cartridge width to an effective width greater than said defined width and securing said rotatable wedge valve cartridge within said cartridge chamber.

10. The method of claim 9 wherein said outer convex surface of said rotatable wedge valve member is oriented with respect to said inner concave surface to define a non-uniform wall thickness along said rotatable wedge valve member, comprising:
after securing said rotatable wedge valve cartridge within said cartridge chamber, rotating said rotatable wedge valve member and moving a region thereof of greater wall thickness into engagement with said valve seat and causing wedging expansion of the effective width of said rotatable wedge valve cartridge and compression of said seat member.

11. The method of claim 9, wherein a core positioning element is located within said valve chamber and is positioned for engagement by said core member, said method comprising:
with said elongate tubular core member inclined, moving said rotatable wedge valve cartridge into said valve chamber until said elongate tubular core member engages with said core positioning element; and
continuing movement of said rotatable wedge valve cartridge into said valve chamber, said movement causing pivotal movement of said elongate core member from said inclined position to a substantially horizontal position and resulting in said increasing said cartridge width to an effective width greater than said defined width.

12. A rotatable wedge cartridge valve mechanism, comprising:
a valve body defining a valve chamber of a defined internal width and having flow ports in communication with said valve chamber;
a rotatable wedge valve cartridge assembly being removeably positioned within said valve chamber and having a controllable width,
said valve cartridge assembly having a cartridge housing and having a core member defining a flow passage and having a substantially spherical outer surface portion;
a valve seat being located within said cartridge housing;
a rotatable wedge valve member defining leading and trailing portions and having a concave surface portion in rotary guided relation with said substantially spherical outer surface, said rotatable wedge valve member having an external convex surface being disposed for sealing engagement with said valve seat and having a non-uniform wall thickness along said rotatable wedge valve member from said leading portion to said trailing portion; and
trunnion and operating stem members supporting said rotatable wedge valve member for rotation within said valve chamber and about said substantially spherical outer surface portion of said core member.

13. The rotatable wedge cartridge valve mechanism of claim 12, comprising:
said trunnion member being integral with said rotatable wedge valve member.

14. The rotatable wedge cartridge valve mechanism of claim 12, comprising:
said trunnion member and said operating stem member each being integral with said rotatable wedge valve member.

15. The rotatable wedge cartridge valve mechanism of claim 12, comprising:
said core member being of elongate tubular configuration and defining a curved surface at one end thereof being disposed in pivotal engagement with said concave surface portion of said rotatable wedge valve member.

16. The rotatable wedge cartridge valve mechanism of claim 12, comprising:
said concave surface portion of said rotatable wedge valve member being of substantially spherical configuration; and
said core member being of elongate configuration and defining a substantially spherical outer surface at one end thereof being disposed in pivotal engagement with said substantially spherical concave surface portion of said rotatable wedge valve member.

17. The rotatable wedge cartridge valve mechanism of claim 12, comprising:

said concave surface portion of said rotatable wedge valve member being of substantially spherical configuration; and said core member being of elongate configuration and defining a tubular section and substantially spherical members being integral with said tubular section, one of said substantially spherical members being disposed in rotatable engagement with said substantially spherical concave surface portion of said rotatable wedge valve member.

18. The rotatable wedge cartridge valve mechanism of claim 12, comprising:

said wedge valve cartridge assembly having a cartridge housing and having a core member defining a flow passage and having a substantially spherical outer surface portion; and a core positioning member being located within said valve chamber and being engaged by and causing width expansion positioning movement of said core member during insertion of said rotatable wedge valve cartridge assembly within said valve chamber.

* * * * *